Patented June 30, 1953

2,643,999

UNITED STATES PATENT OFFICE 2,643,999

PRODUCTION OF CELLULOSE XANTHOGENATE COMPOSITIONS

Nicolas Drisch, Paris, France, assignor, by mesne assignments, to Textile and Chemical Research Company Limited, St. Peter Port, Guernsey, Channel Islands, a corporation of Great Britain No Drawing. Application February 16, 1951, Serial No. 211,428. In Great Britain August 11, 1950

4 Claims. (Cl. 260—217)

1

This invention relates to the production of cellulose xanthogenate compositions and in particular to the production of such compositions which may be spun by a dry spinning process to produce artificial filaments.

For the production of artificial filaments using cellulose xanthogenate it is customary to employ that material in the form of its fully hydrated dispersion in aqueous caustic soda, such dispersion commonly being called "viscose."

It is known to dry-spin viscose and apparatus has been described similar to that known for the manufacture of artificial yarns, from solutions of cellulose derivatives in organic solvents, i. e. a column in which a spinneret is provided at the top, the viscose being extruded through the spinneret to form a bundle of filaments which in their passage down the column are coagulated by partial evaporation of the solvent medium by a current of hot gas, for example air or carbon dioxide. The evaporation of the water from the extruded viscose filaments can be accelerated by maintaining a partial vacuum in the column. In the dry-spinning of viscose under these conditions it is also known to use concentrated solutions, for example viscoses containing 16% of cellulose. Further, it is known that the spinning properties of the viscose in the dry-spinning process can be substantially improved by the addition to the viscose of certain derivatives of antimony.

It has now been found that it is possible to convert aqueous dispersions into filaments by a dry spinning process without supplying external heat and without the necessity of exerting a physical or chemical action on the solution as it leaves the spinnerets, provided that the composition employed is of a particular type. The present invention accordingly provides spinning compositions which consist of a dispersion of cellulose in aqueous caustic soda which has a viscosity of at least 1000 poises and which have a cellulose content of at least 6%, and a caustic soda content of 3–10%, the volume of the dispersion phase being insufficient to produce total hydration of the molecules and the degree of hydration of the molecules being substantially uniform. Said dispersions are hereinafter referred to as "xanthogels" and the xanthogels characteristic of this invention must satisfy two conditions:

1. The viscosity must be higher than 1000 poises and preferably higher than 2000 poises, while the cellulose content may vary from 6 to 25% according to the degree of depolymerization of the collulose. The new expression "xanthogel" has been coined to distinguish from "vis-

2 cose" by which is meant dispersions in which the volume of the dispersing phase (aqueous caustic soda) is sufficient to produce total hydration of the molecules in small groups of dispersed molecules. In the xanthogel on the other hand, the volume of the dispersing phase is insufficient to produce total hydration, which gives very great internal cohesion.

2. The internal molecular dispersion must be as uniform as possible. The direct preparation of xanthogenate gels by the known means does not produce such dispersions. In fact, the insufficiency of the dispersing phase under normal conditions of dissolution leads to the formation of pastes containing large micellary aggregates of low degree of hydration, the degree of hydration being extremely heterogeneous.

In accordance further with the present invention the aforesaid xanthogels are obtained by treating normal viscoses with an organic solvent which is miscible with water but which does not dissolve cellulose, whereby a separation into two layers is effected, respectively solvent diluted with water and viscose of low water content, the consistency and composition of the viscose varying as a function of the quantity of solvent employed, and isolating the said viscose. The said viscose constitutes a xanthogel. Suitable solvents for the purpose are acetone and pyridine.

In accordance with a further feature of this invention such xanthogels are obtained by xanthogenating cellulose with a quantity of carbon dissulphide higher than 35% and preferably from 40–50%, in the presence of caustic soda in such quantity that the gel obtained contains 3–10% caustic soda, malaxating the cellulose xanthogenate obtained under high pressure and at a temperature below 10° C., and during such malaxation adding such quantities of water as are necessary to achieve a viscosity of at least 1000 poises, the product having a cellulose content of at least 6%, such a solution being considered highly viscous.

Conveniently the product of xanthogenation, is malaxated between 2 cylinders turning at different speeds, e. g. 15 and 25 R. P. M., the cylinders being cooled below 10° C. and preferably between —5° C. and +5° C. The material is passed several times through the cylinders until the fibrous structure has disappeared. Water is added and the malaxation continued until the product has the required composition, e. g. it contains 3–6% of caustic soda and 6–20% of cellulose.

By the foregoing methods it is possible to obtain xanthogels containing 6, 10, 20 or 25% cellulose which on microscopic examination do not reveal the presence of any swelled or undispersed fibre. The low temperature used in the treatment prevents hydrolysis of the fixed xanthogenate groups and the reduction in the gamma value during the treatment is only of the order of a few units.

The invention is illustrated by the following examples, which, however, are not to be regarded as limiting the invention in any way:

*Example I*

A normal viscose containing 6.5% of cellulose and 7% of caustic soda is mixed progressively with an equal volume of anhydrous acetone and intimately stirred. The mixture separates into an upper layer of dilute acetone containing part of the caustic soda, carbon disulphide and sulphuretted impurities emanating from the xanthogenation reaction, and a lower layer of concentrated viscose containing 15% of cellulose with 8.55% of caustic soda. This concentrated viscose is separated by decantation and degassed by the usual method. The last traces of acetone are difficult to eliminate but they do not appear to be harmful. Its viscosity is 4500 poises.

*Example II*

330 kg. of cotton linters having a degree of polymerisation of 750 are converted to alkali cellulose by treatment with caustic soda, the product containing 30% cellulose and 15% caustic soda and having a degree of polymerisation of the cellulose of 450. This alkali cellulose is xanthogenated with 45% of carbon disulphide for 3 hours. The product is powdered and malaxated on rolls with 1112 kg. of 3% aqueous caustic soda, the temperature being maintained at 2° C., and the material being passed 10 times between the rollers set at 5 mm. distance apart. 210 kg. of water is then added and the malaxation continued for 2 hours in a Banbury mixer at 0° C. There is thus obtained a xanthogel containing 7.8% caustic soda and 13% of cellulose, having a viscosity of 2500 poises.

The production of artificial filaments from xanthogenate as defined in the present invention forms the subject matter of my co-pending application No. 211,427 filed on even date herewith, now Patent No. 2,621,103.

I claim:

1. Process for the production of a highly viscous cellulose xanthate gel which comprises xanthogenating cellulose with at least 35% carbon disulphide, repeatedly calendering the cellulose xanthogenate thus produced under high pressure and at a temperature below 10° C., and adding during such repeated calendering a quantity of water such that the viscosity of the product exceeds 1000 poises, its cellulose content is at least 6% and its caustic soda content is 3-10%.

2. Process for the production of a highly viscous cellulose xanthate gel which comprises xanthogenating cellulose with 40-50% carbon disulphide, repeatedly calendering the cellulose xanthogenate thus produced under high pressure and at temperature below 10° C., and adding during such repeated calendering a quantity of water such that the viscosity of the product exceeds 1000 poises, its cellulose content is 20-25% and its caustic soda content is 3-10%.

3. Process for the production of a highly viscous cellulose xanthate gel which comprises xanthogenating cellulose with at least 35% carbon disulphide, repeatedly calendering between rolls rotating at different relative speeds the cellulose xanthogenate thus produced under high pressure and at a temperature below 10° C., and adding during such repeated calendering a quantity of water such that the viscosity of the product exceeds 1000 poises, its cellulose content is at least 6% and its caustic soda content is 3-10%.

4. Process for the production of a highly viscous cellulose xanthate gel which comprises xanthogenating cellulose with 40-50% carbon disulphide, repeatedly calendering the cellulose xanthogenate thus produced under high pressure and at a temperature below 10° C., and adding during such repeated calendering a quantity of water such that the viscosity of the product exceeds 1000 poises, its cellulose content is 10-25% and its caustic soda content is 3-10%.

NICOLAS DRISCH.

References Cited in the file of this patent

UNITED STATES PATENTS

| Number | Name | Date |
|---|---|---|
| 986,306 | Naudin | Mar. 7, 1911 |
| 1,936,483 | Scheller | Nov. 21, 1933 |
| 2,072,738 | Dykstra | Mar. 2, 1937 |
| 2,076,596 | Richter | Apr. 13, 1937 |
| 2,126,975 | Richter | Aug. 16, 1938 |
| 2,369,718 | Cramer | Feb. 20, 1945 |
| 2,495,235 | Pierrat et al. | Jan. 24, 1950 |

FOREIGN PATENTS

| Number | Country | Date |
|---|---|---|
| 778,947 | France | Jan. 5, 1935 |
| 898,253 | France | June 26, 1944 |
| 906,159 | France | May 7, 1945 |